(12) United States Patent
Marduel

(10) Patent No.: US 10,821,471 B2
(45) Date of Patent: Nov. 3, 2020

(54) APPARATUS AND METHOD FOR IMPREGNATION BY TRANSFERRING A POWDER INTO A POROUS SUBSTRATE

(71) Applicant: FIBROLINE FRANCE, Ecully (FR)

(72) Inventor: Joric Marduel, Chazay d'azergues (FR)

(73) Assignee: FIBROLINE FRANCE, Ecully (FR)

( * ) Notice: Subject to any disclaimer, the term of this patent is extended or adjusted under 35 U.S.C. 154(b) by 239 days.

(21) Appl. No.: 15/021,631

(22) PCT Filed: Sep. 25, 2014

(86) PCT No.: PCT/FR2014/052421
§ 371 (c)(1),
(2) Date: Mar. 11, 2016

(87) PCT Pub. No.: WO2015/044605
PCT Pub. Date: Apr. 2, 2015

(65) Prior Publication Data
US 2016/0228909 A1    Aug. 11, 2016

(30) Foreign Application Priority Data
Sep. 26, 2013   (FR) .................................... 13 59315

(51) Int. Cl.
*B05C 19/06*    (2006.01)
*B29C 31/06*    (2006.01)
(Continued)

(52) U.S. Cl.
CPC ............ *B05C 19/06* (2013.01); *B05C 5/0245* (2013.01); *B05C 11/025* (2013.01); *B05C 19/04* (2013.01); *B29B 15/12* (2013.01); *B29C 31/066* (2013.01)

(58) Field of Classification Search
CPC ........ B05C 5/0245; B05C 19/04; B05D 1/007
See application file for complete search history.

(56) References Cited

U.S. PATENT DOCUMENTS 2,370,636 A    3/1945  Carlton
2,808,098 A   10/1957  Chavennes et al.
(Continued)

FOREIGN PATENT DOCUMENTS

DE    102004046745 A1    4/2006
FR       2589783 A1       5/1987
(Continued)

OTHER PUBLICATIONS

International Search Report issued in PCT/FR2014/052421 dated Feb. 6, 2015.
(Continued)

*Primary Examiner* — Alex A Rolland
(74) *Attorney, Agent, or Firm* — Marshall, Gerstein & Borun LLP

(57) ABSTRACT

An installation for impregnating a porous substrate by transfer of powder, including an area for storing the powder, and an endless conveyor capable of being moved, which includes an external surface containing cavities. The external surface of the conveyor delimits an edge of the storage area to fill said cavities with the powder. The installation comprises a positioner for holding the porous substrate in contact with a fraction of the conveyor length, to seal cavities containing the powder. A drive device enabling to move the conveyor and the porous substrate, and means for displacing the powder are arranged opposite said fraction of the conveyor length, to at least partly displace a portion of the powder across the porous substrate.

16 Claims, 3 Drawing Sheets

Figure 1:
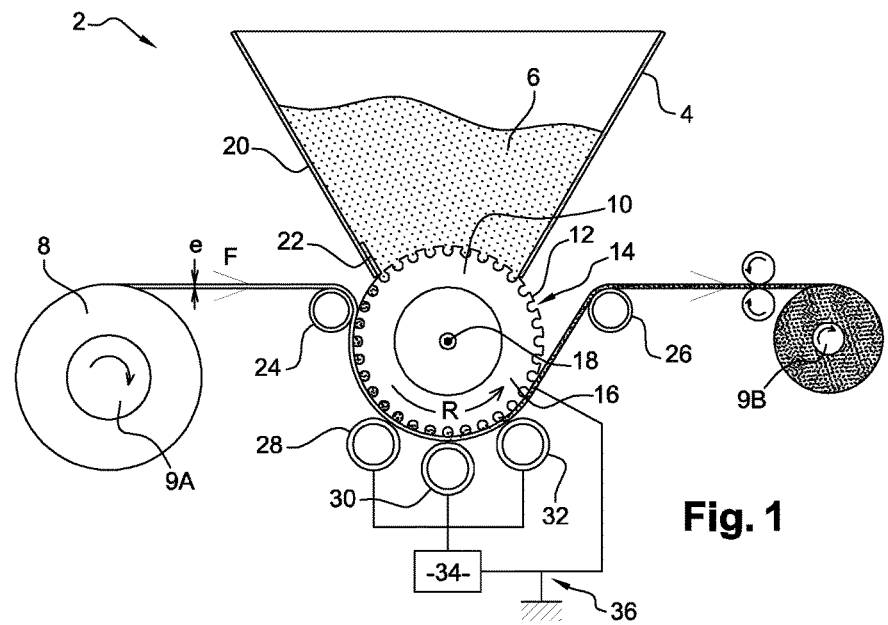

(51) Int. Cl.
*B29B 15/12* (2006.01)
*B05C 5/02* (2006.01)
*B05C 11/02* (2006.01)
*B05C 19/04* (2006.01)

(56) References Cited

U.S. PATENT DOCUMENTS

| | | | | |
|---|---|---|---|---|
| 3,667,422 | A | | 6/1972 | Saladin |
| 4,060,648 | A | * | 11/1977 | Taylor-Brown ......... B05B 5/14 |
| | | | | 427/482 |
| 4,715,918 | A | * | 12/1987 | Lang ................. A61F 13/15634 |
| | | | | 156/273.1 |
| 5,099,553 | A | * | 3/1992 | Dischler ................ D06C 11/00 |
| | | | | 26/2 R |
| 2002/0187701 | A1 | * | 12/2002 | Healey ............... B01D 39/1623 |
| | | | | 442/382 |
| 2006/0216426 | A1 | * | 9/2006 | Brown ............... B05B 13/0207 |
| | | | | 427/421.1 |
| 2009/0214606 | A1 | * | 8/2009 | Bujard ................... A01N 25/08 |
| | | | | 424/401 |
| 2011/0177736 | A1 | * | 7/2011 | Donovan .................. B32B 5/22 |
| | | | | 442/148 |
| 2011/0253511 | A1 | * | 10/2011 | Jackels ............. A61F 13/15658 |
| | | | | 198/689.1 |
| 2014/0261992 | A1 | * | 9/2014 | Liang ..................... B32B 38/10 |
| | | | | 156/238 |

FOREIGN PATENT DOCUMENTS

| | | |
|---|---|---|
| FR | 2933327 A1 | 1/2010 |
| JP | S4616435 Y1 | 5/1971 |
| JP | S4911854 B1 | 3/1974 |
| JP | S6016904 B2 | 4/1985 |
| JP | S6039103 B2 | 9/1985 |
| JP | H0114823 B2 | 3/1989 |

OTHER PUBLICATIONS

Office Action issued in Chinese Patent Application No. 201480051740.6 dated Feb. 24, 2018.
Office Action issued in Japanese Patent Application No. 2016-516004 dated Jul. 18, 2018.

* cited by examiner

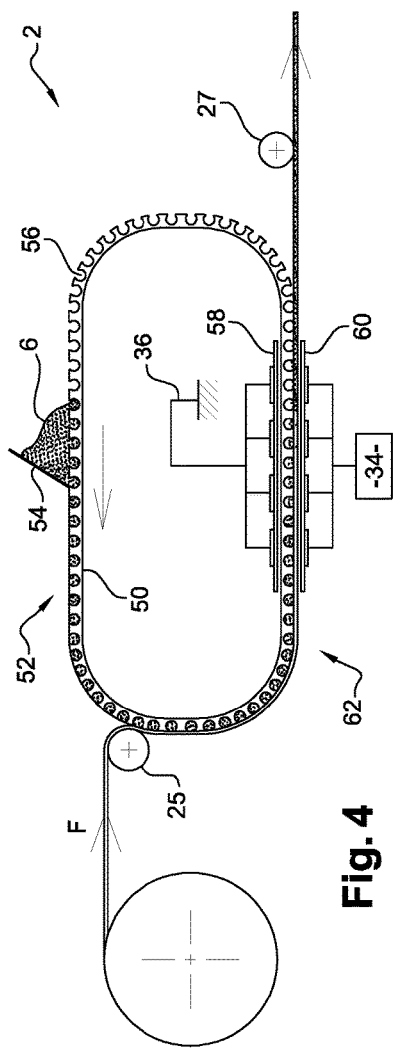
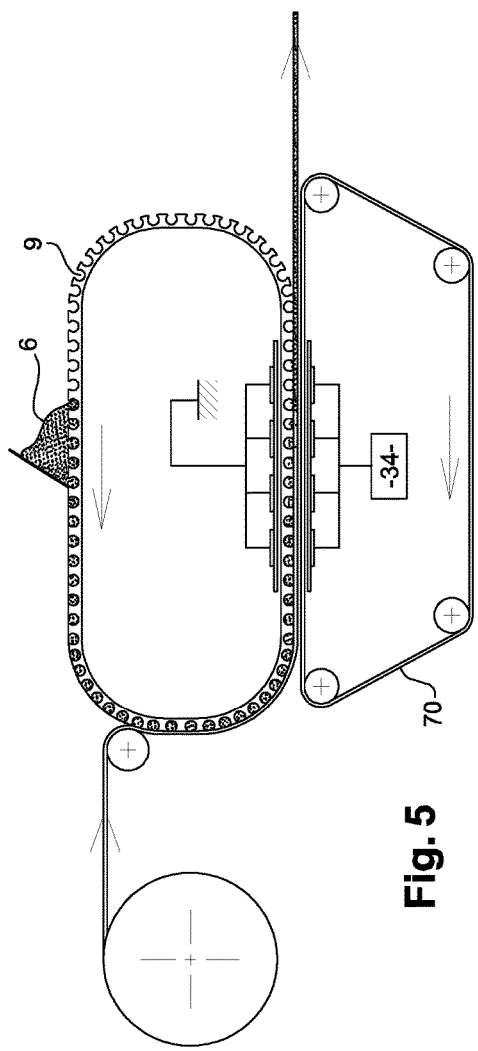
Fig. 4
Fig. 5

APPARATUS AND METHOD FOR IMPREGNATION BY TRANSFERRING A POWDER INTO A POROUS SUBSTRATE

CROSS-REFERENCE TO RELATED APPLICATIONS

This application is a national stage application under 35 U.S.C. § 371 and claims the benefit of priority of international application no. PCT/FR2014/052421, filed Sep. 25, 2014, which claims the benefit of priority under 35 U.S.C. § 119 of French patent application no. 1359315, filed Sep. 26, 2013, and the entire contents of each is hereby incorporated herein by reference, in its entirety and for all purposes.

TECHNOLOGICAL FIELD

The present disclosure relates to the impregnation of porous substrates with powder materials. "Porous substrate" means a material comprising porosities capable of receiving powder. It may in particular be a fibrous network, such as for example nonwoven or fabric, paper, or even open-cell foam.

BACKGROUND OF THE DISCLOSURE

The impregnation of a porous substrate with a powder material advantageously enables to modify the properties thereof. Indeed, a same substrate may be used in different fields of activity according to the nature of the powder impregnating it. For example, the impregnation of a substrate by a powder containing an active antibacterial is used in the medical field for dressings, while the same substrate impregnated with a superabsorbent powder is used to form diapers.

Document FR 2 933 327 describes an example of an installation enabling to impregnate a porous substrate with a powder present thereon, by application of an AC electric field on the substrate having previously received a quantity of powder on its surface. The powder grains are displaced across the substrate thickness by application of an AC electric field substantially perpendicular to the substrate.

The powder is deposited on the substrate by a technique of sprinkling with a dosing cylinder. In contact with the substrate, part of the powder grains bounces on the substrate and forms a cloud of material suspended at the level of the deposition area, capable of depositing outside of the desired area on the substrate. Too thin or too light powders may possibly not deposit on the substrate due to their travel between the reservoir delivering them and the substrate. The sprinkling technique thus exhibits high risks of dispersion of the powder in the outer environment, a limited accuracy of deposition, and non-negligible losses of matter.

Such phenomena are amplified when the substrate is moving with respect to the powder moving system. Indeed, the displacement of the substrate generates aerodynamic disturbance phenomena at the level of its surface, favoring the displacement of the powder cloud. The faster the substrate is moving, the more the powder tends to be moved above the substrate. It is then necessary to find a tradeoff between the running speed and the accuracy of the powder deposition.

Once the powder has been deposited, a second step comprises favoring the impregnation of the textile with the powder. For this purpose, different techniques may be used. Generally, such techniques comprise displacing the powder in the textile by means of a mechanical, pneumatic, electrostatic, etc. device. During this excitation, part of the powder is suspended above the textile. The above-mentioned disadvantages then appear again.

SUMMARY OF THE DISCLOSURE

The present disclosure aims at providing an installation for impregnating a porous substrate with a powder, allowing a more accurate deposition, possibly according to a pattern, and a faster production speed, while limiting the risk of disseminating in the environment the powder impregnating said substrate.

The present disclosure relates to a device of impregnation by transfer of a powder material into a porous material, enabling to limit the dissemination of the powder in the environment.

To solve such a problem, the Applicant provides an installation for impregnating a porous substrate by transfer of powder, comprising an area for storing the powder, and an endless conveyor capable of being moved and having an external surface comprising cavities.

The external surface of the conveyor delimits an edge of the storage area, to fill said cavities with the powder. Further, this installation comprises a positioner configured to hold the porous substrate in contact with a fraction of the conveyor length, to seal cavities containing the powder along this fraction of the conveyor length. The disclosed embodiments also comprise a drive device enabling to move the conveyor and the porous substrate, and an actuator for displacing the powder are arranged opposite said fraction of the conveyor length, to displace at least a portion of the powder across the porous substrate.

The positioner for positioning the substrate enable the latter to cover the cavities of the conveyor containing the powder before, during, and possibly after the transfer and impregnation thereof into said substrate. Thereby, the powder is confined between the conveyor and the substrate at least until its transfer into the substrate. The positioner may for example comprise at least one tension roller or angle transmission rollers arranged on either side of the conveyor. The placing of the substrate against the conveyor may also be obtained by a substrate tensioning mechanism, between an area of unreeling and reeling of the porous substrate.

Such a confinement of the powder between the porous substrate and the conveyor advantageously enables to limit the suspending of the powder in the environment, since the powder does not have to move in an air jet on transfer thereof onto the porous substrate and/or on displacement of the porous substrate before impregnation thereof. Thus, a very small quantity of powder is disseminated in the environment during these steps, which makes the transfer more accurate and more economical in terms of material.

Of course, to limit as much as possible the dissemination of the powder in the environment, the positioner may be designed so that the substrate covers the conveyor as soon as possible downstream of the area where the powder is deposited into the cavities. It is also possible to provide for the storage area dispensing the powder to be arranged at closest to the area where the porous substrate is placed in contact with the conveyor.

Another advantage of the disclosed embodiments is to allow a confinement of the powder during the impregnation of the porous substrate therewith. This impregnation step requires for the actuator to move the powder grains. Due to the disclosed improvements, the moving powder is confined between the porous substrate and the external surface of the conveyor. Of course, the porous substrate may be held in contact with the external surface of the conveyor until the quantity of powder suspended in said cavities is zero or negligible. Here again, the disclosed embodiments facilitate limitation of the dissemination of the powder in the environment, so that the impregnation is thus more accurate with a much lower material loss ratio.

The means for displacing the installation enable to move the porous substrate and the conveyor at the same speed. The conveyor and the substrate may be moved by synchronous independent means. Other configurations are possible. Thus, for example, the conveyor may be displaced via the displacement device, the conveyor causing by friction the displacement of the porous substrate. Of course, the inverse configuration is possible. It is preferable for the porous substrate and the conveyor to move at the same speed to allow a deposition of powder, contained in a cavity, on a surface of the substrate accurately corresponding to the dimensions of the opening of said cavity. Thereby, the powder distribution on the porous substrate accurately corresponds to the cavity distribution on the conveyor. It is thus possible to deposit the powder onto the porous substrate according to a desired geometric pattern.

According to another example, the means for displacing the installation may move the conveyor and the porous substrate with asynchronous independent means. The porous substrate can thus slide on the conveyor, to allow the deposition of the powder on surface areas of the substrate larger than the dimensions of the openings of the cavities, according to the speed difference between the substrate and the conveyor.

The external surface of the conveyor may comprise cavity-free surface portions, to deposit the powder on the substrate and impregnate the substrate with the powder according to a desired pattern. In other words, the cavities may form a pattern on the external surface of the conveyor, which enables to impregnate a specific area of the substrate, while leaving the rest of the surface little or not impregnated. Losses of powder material are thus avoided when the porous substrate is intended to then be cut according to a shape close to said pattern.

The impregnation installation may comprise means for scraping the external surface of the conveyor to remove the powder present on its surface, before covering with the porous substrate the cavities containing the powder. In other words, the scraping means enable to remove the powder present between the cavities, so that the geometric pattern formed by the cavities is accurately reproduced by the powder on the porous substrate. The scraping means are preferably positioned on an edge of the storage area, so that the powder coming out of said area is only present in the cavities. This advantageously enables to save powder in the storage area.

The disclosed embodiments also facilitate accurate control of the quantity of powder deposited in the porous substrate and impregnating it. Indeed, the volume of the cavities and their number enable to accurately know the positions and the quantities of powder having impregnated the substrate. The quantity of powder present in the cavities may possibly be modified according to the air gap between the conveyor and the scraping means, or to the pressure with which the scraping means are applied onto the conveyor.

The conveyor of the installation ensuring the displacement of the powder may be formed in various ways. It may thus, for example, be a belt conveyor, preferably with a flexible belt, such as for example a belt of PVC-type plastic material. According to a variation, the conveyor may be a cylindrical conveyor, particularly of rigid cylindrical shape.

The displacement of the powder into the porous substrate may be performed in a large variety of ways. Thus, according to a specific technology, the means for displacing the powder into the porous substrate may comprise a device generating an AC electric field substantially perpendicular to the surface of the conveyor comprising the cavities, to favor the displacement of the powder grains across the substrate thickness. The thickness of the porous substrate is here defined along a direction perpendicular to the external surface of the conveyor in contact with said substrate. More specifically, the device generating the AC electric field may comprise at least two electrodes arranged on either side of the porous substrate. The cylindrical conveyor may advantageously form one of these electrodes.

According to another embodiment, the displacement means may also comprise at least one vibrating device generating vibrations transmitted to the porous substrate. Preferably, the vibrations are applied to the porous substrate along a direction substantially perpendicular to its thickness. The disclosed embodiments relate to multiple variations of means enabling to generate such vibrations. Thus, the vibrating device may comprise at least one roller of irregular cross-section and rotating, with a drive mechanism or not, around an axis substantially parallel to the porous substrate. Irregular cross-section means that it is not a shape of revolution or that the contour of the roller cross-section does not form a circle.

Possibly, in the case where the powder can cross the entire thickness of the porous substrate, a device for confining the powder in the substrate may be arranged under said substrate to recover the powder. It may be a conveyor belt which runs under the substrate.

The disclosed embodiments also aim at a method of impregnating a porous substrate with powder, where the above-described principle of storing a quantity of powder in cavities coming opposite the porous substrate is used. Thus, generally, it may be advantageous to deposit the powder in the cavities of an intermediate transfer element, having its surface provided with the cavities placed in contact with the porous substrate, to seal the cavities containing the powder. Then, the powder is moved in the cavities to favor the insertion thereof into the substrate sealing said cavities.

This principle may be implemented statically, that is, by associating the porous substrate and the intermediate transfer element before submitting the assembly to the moving of the powder, which comes out of the cavities to spread into the porous substrate during a phase of fixed duration.

This same principle may be continuously exploited, with the running of a porous substrate associated with an intermediate transfer element inside of a processor section where the powder is moved. Advantageously, the intermediate transfer element may be formed by a conveyor which continuously collects the powder from a storage area, as described hereabove.

DESCRIPTION OF THE DRAWINGS

The present disclosure will be better understood on reading of the following description provided as a non-limiting indicative example only in relation with the accompanying drawings, where the same reference numerals designate the same or the like elements:

FIG. 1 illustrates a simplified cross-section view of an impregnation device;

FIGS. 2 and 3 are cross-section views illustrating alternative embodiments of the device shown in FIG. 1;

FIG. 4 illustrates a simplified cross-section view of another embodiment of an impregnation device; and FIG. 5 illustrates a simplified cross-section view of a variation of an impregnation device according to FIG. 4.

DETAILED DESCRIPTION

It should be reminded that the present application aims at providing an installation for impregnating a porous substrate with powder, faster, while limiting the risk of powder dissemination during this step.

FIG. 1 illustrates a first example of an impregnation installation 2. This installation comprises a storage area, in the present case, a hopper 4, containing powder material 6 intended to impregnate a porous substrate 8. Of course, the grain size and the nature of the powder may be adapted according to the porosity and to the desired functionalization of the porous substrate. Similarly, the powder may integrate various components, in terms of chemical composition or of grain size, and integrate additives or other complementary compounds intended to give specific properties to the powder.

The bottom of hopper 4 is sealed by upper surface 10 of a rigid cylindrical conveyor 12, to confine the powder in the hopper. The cylindrical conveyor comprises an upper portion 10 at the level of which the powder is deposited, and a lower portion 16 at the level of which the conveyor is in contact with the porous substrate, over a certain angular sector. Cylindrical conveyor 12 pivots around an axis 18 perpendicular to the plane of FIG. 1 along the direction of arrow R.

The cylinder surface comprises a plurality of cavities 14 for example homogeneously distributed along its circumference. Cavities 14 form areas recessed with respect to the main surface of the conveyor, which may receive powder. When the conveyor runs in front of hopper 4, powder 6 displaces by gravity and fills cavities 14. A scraper 22 is arranged between the cylinder and the edge of hopper 20 having the powder coming out of it. The scraper is arranged opposite the cylinder to retain in the hopper the powder present between cavities 14. The scraper may take various configurations, such as a strip of polymer material sweeping the cylinder surface, or a brush having its bristles directed towards the cylinder. In this case, the distance between the scraper and the cylinder surface is settable to allow the brush bristles to penetrate more or less into the cavities to remove a controlled quantity of powder. Thereby, scraper 20 enables to control the quantity of powder 6 coming out of hopper 4, and to limit the presence of the powder in cavities 14.

The powder contained in cavities 14 is then placed in contact with porous substrate 8 on pivoting of cylindrical conveyor 12. At least part of the powder contained in cavities 14 is then deposited by gravity onto porous substrate 8 according to the arrangement of said cavities on cylindrical conveyor 12.

A first and a second positioning cylinder 24 and 26, both freely rotating around an axis perpendicular to the plane of FIG. 1, are arranged parallel to cylindrical conveyor 12 to enable porous substrate 8 to go round said cylinder along the surface thereof. A drive device, not shown in FIG. 1, enables to unreel the porous substrate at a much higher speed, typically from 5 to 10 times higher than conventional machines, such as those described in patent FR 2 933 327. The porous substrate displaces along the direction indicated by arrow F in FIG. 1. The porous substrate is driven by a reeling and unreeling mechanism 9A and 9B. Cylindrical conveyor 12 is rotated by a drive mechanism which may be synchronized with the displacement of the porous substrate. More specifically, the surface of the cylinder and of the porous substrate displace at the same speed so that a cavity 14 is in contact with a same surface element of the porous substrate.

First positioning cylinder 24 is placed upstream of cylindrical conveyor 12, at the level of its upper portion 10, so that the porous substrate retains powder 6 in cavities 14 as they are flipped over. Terms upstream and downstream are defined with respect to the displacement direction of the porous substrate. Thereby, the height from which the powder falls on the porous substrate is very low, and few powder grains are then placed in suspension as the powder is being deposited onto the porous substrate. Further, the powder is confined in cavities 14 during this transfer, thus limiting the dispersion thereof on the porous substrate or in the environment. Thereby, the powder thus perfectly reproduces on the porous substrate the arrangement or the geometric pattern formed by cavities 14 on cylindrical conveyor 12.

In the case where the powder is volatile, it is advantageous to place first cylinder 24 at closest to hopper 4 so that the porous substrate covers cavities 14 as soon as they come out of hopper 4. Thereby, the porous substrate confines the powder and thus limits risks of dissemination of the powder material in the environment.

Second positioning cylinder 26 is placed downstream of cylindrical conveyor 12, to form an angle transmission while holding the porous substrate against lower portion 16 of the cylinder on impregnation thereof with powder 6. Thereby, the powder is protected from air movements capable of dispersing it on the porous substrate or in the environment. There are then less powder losses and the displacement speed of the porous substrate is not a strongly limiting factor in the substrate impregnation method.

The impregnation of the porous substrate with the powder is favored by the use of an excitation device, giving the powder a sufficient kinetic energy to allow a better emptying of cavities 14 and favor its displacement across the thickness of porous substrate 6. Thickness e of the substrate is defined along a direction perpendicular to the surface of the cylindrical conveyor when the substrate is in contact therewith.

The excitation device is formed of three tubular electrodes 28, 30, and 32, arranged parallel to and along the circumference of cylindrical conveyor 12. More specifically, the electrodes are positioned at the level of lower portion 16 of the cylinder at a distance in the range from thickness e of the substrate to 30 mm. The electrodes are connected to a single-pole output of a high-voltage electrostatic generator 34. The cylindrical conveyor made of a conductive material, typically of metal, is connected to ground 36 of the generator to form a counter-electrode. The generator is started on displacement of the porous substrate to create, at the level of the contact areas between the powder and the substrate, an AC electric field having a value in the range from 5 to 30 kVolts. This electric field enables to electrically charge the powder grains to alternately accelerate them towards the opposite electrodes, with a frequency in the range from a few tens to a few hundreds of Hertz. The powder thus progressively migrates across the thickness of the porous substrate. The phenomena of electric charge of the powder grains also generate a repulsion of the grains from one another, favoring the migration and the homogenizing of the powder across the substrate bulk.

Figure 2:
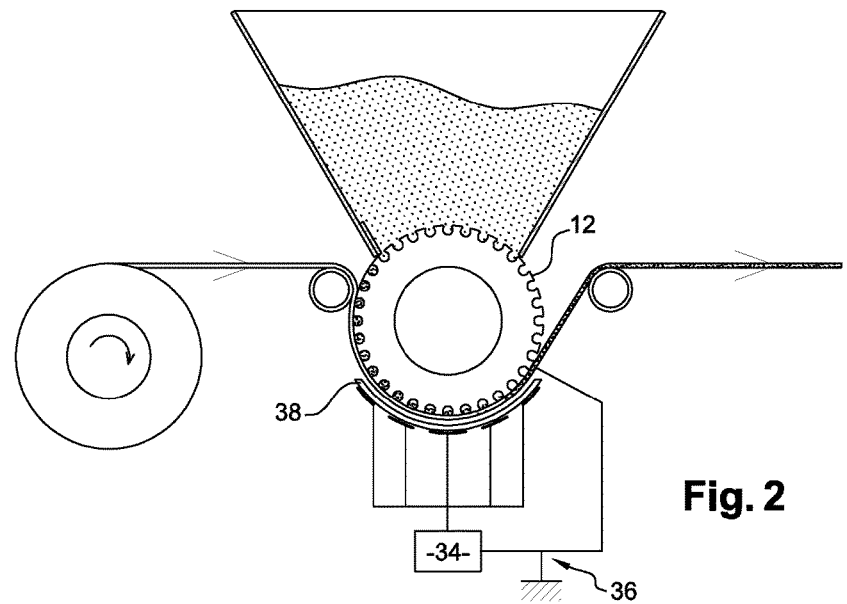

According to the porosity of the substrate and to the grain size of the powder, the time of exposure to the excitation source and its excitation level may be modified according to the desired degree of impregnation of the powder into the substrate. For example, to allow a deeper impregnation, the duration of the excitation may be lengthened by increasing the number of electrodes arranged along the conveyor cylinder, or as illustrated in FIG. 2 by replacing said electrodes with a continuous electrode 38 of concave shape and parallel to the surface of the cylindrical conveyor. Of course, the duration of excitation of the powder may also be lengthened by decreasing the displacement speed of the porous substrate.

The use of a plurality of parallel tubular electrodes having different cross-sections, arranged along the lower portion of the cylindrical conveyor, also is a possible variation to displace the powder across the porous substrate.

Preferably, the above-mentioned electrodes are covered with a dielectric shield, to prevent the forming of electric arcs at their surface and thus avoid a premature aging thereof. For the same reasons, the surface of the cylindrical conveyor may also be covered with a shield of same nature. The value of the applied electric field may then be increased by decreasing risks of forming of electric arcs between the electrodes. The impregnation of the porous substrate with the powder may thus be performed faster and/or deeper. An alternative configuration would combine a cylindrical electrode on which an insulating conveyor, having the cavities on its external surface, would be assembled.

Figure 3:
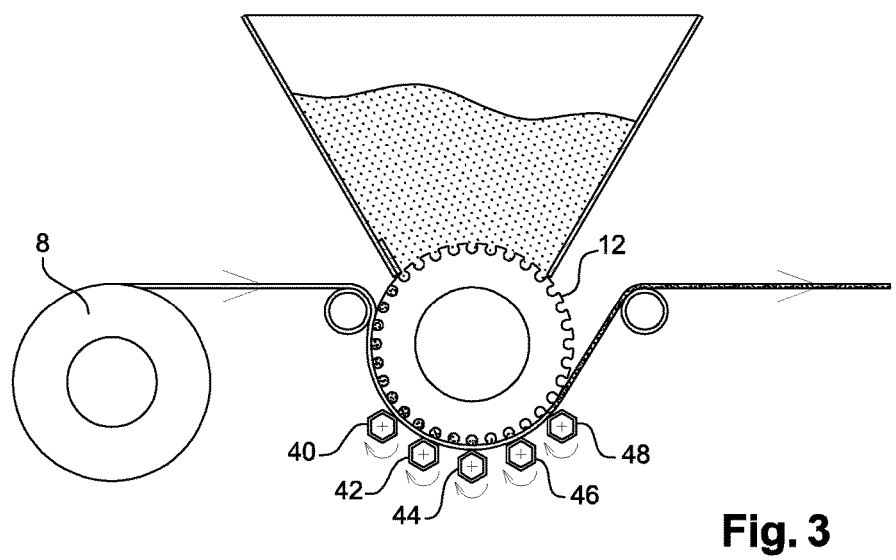

Of course, the above-described excitation devices may be completed or replaced with other devices favoring the displacement of the powder across the porous substrate. FIG. 3 shows an example of an excitation device of vibrating type, comprising freely-rotating bars 40, 42, 44, 46, and 48 of polygonal cross-section, having their diameter selected according to the thickness of the porous substrate and to its running speed. For example, the bars may have a hexagonal cross-section with a diameter in the range from 10 to 20 mm. The bars are arranged parallel to cylindrical conveyor 12, and sufficiently close to its surface to allow their pivoting on passing of porous substrate 8. Thereby, the bars apply a variable pressure on the substrate, generating vibrations in said substrate, which favors the migration of the powder thereacross. To adapt the pressure applied by the bars according to the porous substrate and to the depth of impregnation with the powder, other embodiments are possible by modifying at least one of the following characteristics: the distance between bars and the cylinder surface, the shape of the bars, their rotation speed, etc.

Other known excitation devices may be envisaged to favor the impregnation of the porous substrate with the powder, such as for example devices of acoustic, ultrasonic, aeraulic, pneumatic, etc. type.

FIG. 4 shows another embodiment which differs from the previous examples by the replacing of cylindrical conveyor 12 with a belt conveyor 50. The belt of the conveyor is made of a flexible material such as plastic and comprises cavities capable of storing powder 6. It may also be a fabric having its weave defining the cavities which receive the powder. A conveyor belt comprises an upper portion 52 having powder 6 applied onto it. A scraper 54 applied against the belt conveyor enables to confine and to control the quantity of powder present in cavities 56. The belt conveyor has a function of dosing and transferring powder 6 from the scraper to the excitation device. Advantageously, the conveyor belt enables to more flexibly adapt the impregnation device to an already-existing excitation device. Indeed, the length and the travel of the belt may be modified according to the arrangement of the excitation device. For example, the belt conveyor and positioning cylinders 25 and 27 may be positioned so that the porous substrate in contact with lower portion 62 of said belt runs through an excitation device formed by two sets of electrodes 58 and 60. This type of excitation device is for example described in document FR 2 933 327. The fact for belt conveyor 50 to remain in contact with the porous substrate on impregnation thereof prevents the dissemination of the powder on the substrate and more generally in the tunnel formed by the electrodes. Thereby, the impregnation of the porous substrate is performed more accurately and with a lower loss of powder. On the other hand, during this impregnation step, belt conveyor 50 isolates the powder from aerodynamic disturbances due to motion of the porous substrate, the running speed of the belt conveyor is much less limited by this phenomenon and can thus allow production speeds much greater than those known to date.

Possibly, in the case where the porous substrate is permeable to powder, a conveyor belt 70 non-permeable to said powder may be arranged as illustrated in FIG. 5, under porous substrate 8 to confine said powder on displacement thereof across the substrate.

As a conclusion, the described embodiments provide a plurality of installations for impregnating a porous substrate with powder, advantageously enabling to confine the powder on the substrate according to a regular or irregular pattern, before and during the impregnation thereof. Thus, risks of dissemination in the environment are limited. The impregnation of the porous substrate may thus be performed at higher speed, with little or no loss of powder.

The invention claimed is:

1. An installation for impregnating a porous substrate by transfer of powder, comprising:
   an area for storing the powder; and
   a conveyor capable of coming into contact with the porous substrate and having an external surface comprising cavities;
   wherein:
   the external surface of the conveyor delimits an edge of the storage area to fill said cavities with the powder; and
   a positioner configured to hold the porous substrate in contact with a fraction of the conveyor length, to seal cavities containing the powder along said fraction of the conveyor length; and
   a drive device enables to move the conveyor and the porous substrate; and
   three or more electrodes generating an AC electric field substantially perpendicular to the surface of the conveyor, configured to alternately accelerate the powder within the sealed cavities, and arranged opposite said fraction of the conveyor length, at least partly displacing a portion of the powder across a thickness of the porous substrate.

2. The impregnation installation of claim 1, wherein the external surface of the conveyor comprises cavity-free surface portions.

3. The impregnation installation of claim 1, further comprising a scraper for scraping the external surface of the conveyor to remove the powder present outside of the cavities, before covering with the porous substrate said cavities containing powder.

4. The impregnation installation of claim 1, wherein the conveyor is a belt conveyor.

5. The impregnation installation of claim 1, wherein the conveyor is a cylindrical conveyor.

6. The impregnation installation of claim 5, wherein the cylindrical conveyor forms one of the three or more electrodes.

7. The impregnation installation of claim 1, wherein the three or more electrodes comprises at least two electrodes arranged on either side of the porous substrate.

8. The impregnation installation of claim 1, wherein the fraction of the conveyor length comprises at least 25% of the conveyor length.

9. A method of impregnating a porous substrate with powder, wherein powder is deposited into a plurality of cavities present on an intermediate transfer element, and wherein the porous substrate is then placed into contact with the intermediate transfer element to seal the plurality of cavities containing the powder, and wherein the powder is then moved in the plurality of cavities by an AC electric field generated by three or more electrodes and configured to alternately accelerate the powder within the sealed cavities, displacing the powder into and across a thickness of the substrate sealing said cavities.

10. The method of claim 9, wherein the intermediate transfer element and the porous substrate are moving during the phase where the powder is moved.

11. The method of claim 9, wherein the intermediate transfer element and the porous substrate are motionless during the phase where the powder is moved.

12. The method of claim 9, wherein the AC electric field is generated over at least 25% of the intermediate transfer element.

13. A method of impregnating a porous substrate with powder, wherein powder is deposited in cavities present on an intermediate transfer element, and wherein the porous substrate is then placed into contact with the intermediate transfer element to hold the powder within the cavities as the cavities are moved from a first position in which they receive the powder to a second position in which the powder is deposited on to porous substrate, and wherein the powder is then moved by an AC electric field generated by three or more electrodes and configured to alternately accelerate the powder in the sealed cavities and displacing the powder into the substrate sealing said cavities.

14. The method of claim 13, wherein the intermediate transfer element and the porous substrate are moving during the phase where the powder is moved.

15. The method of claim 13, wherein the intermediate transfer element and the porous substrate are motionless during the phase where the powder is moved.

16. The method of claim 13, wherein the AC electric field is generated over at least 25% of the intermediate transfer element.

* * * * *